(12) United States Patent
Mashimo

(10) Patent No.: US 7,901,002 B2
(45) Date of Patent: Mar. 8, 2011

(54) CLIP FOR TENSIONING AND ATTACHING TRIM COVER, AND VEHICLE SEAT

(75) Inventor: Tomoyuki Mashimo, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 12/256,895

(22) Filed: Oct. 23, 2008

(65) Prior Publication Data

US 2009/0140569 A1    Jun. 4, 2009

(30) Foreign Application Priority Data

Oct. 23, 2007   (JP) ................................. 2007-275352

(51) Int. Cl.
*A47C 27/00*   (2006.01)

(52) U.S. Cl. .................. 297/218.3; 297/218.5; 297/226; 297/228.13; 297/452.38

(58) Field of Classification Search ............... 297/218.3, 297/218.5, 226, 228.13, 452.38
See application file for complete search history.

(56) References Cited

U.S. PATENT DOCUMENTS

| | | | | |
|---|---|---|---|---|
| 4,865,383 A | * | 9/1989 | Sbaragli et al. | 297/218.2 |
| 5,518,292 A | * | 5/1996 | Cozzani | 297/218.5 |
| 5,605,373 A | * | 2/1997 | Wildern et al. | 297/218.4 |
| 5,826,312 A | * | 10/1998 | Schroder et al. | 24/601.2 |
| 6,048,025 A | * | 4/2000 | Tillner | 297/218.1 |
| 6,568,761 B2 | * | 5/2003 | Perske et al. | 297/452.6 |
| 7,287,305 B2 | * | 10/2007 | Bednarski | 24/297 |
| 7,568,761 B2 | * | 8/2009 | Mashimo | 297/218.4 |

FOREIGN PATENT DOCUMENTS

JP           2006122594        5/2006

* cited by examiner

*Primary Examiner* — Laurie K Cranmer
(74) *Attorney, Agent, or Firm* — Dann, Dorfman, Herrell and Skillman, P.C.

(57) ABSTRACT

A clip for use in a cushion for a vehicle seat, wherein the cushion includes a cushioned pad and a trim cover, the cushioned pad having a recess portion and a wire embedded in the cushioned pad so as to be partially exposed to the recess portion from the cushioned pad, the trim cover having a portion, a longitudinal tensioning cord attached to the portion of the trim cover, a longitudinal bulged member provided along a longitudinal edge portion of the cord, and a laterally elongated through-hole formed in the cord. The clip which includes pawls, a stopper piece and a hook portion is adapted to be hooked between the bulged member and an exposed axial portion of the wire with the frame body receiving the bulged member therein and retainingly holding the bulged member, with the pawls being stoppingly engaged with the bulged member, with the stopper piece being inserted through the through-hole, and with the hook portion being hooked to the exposed axial portion of the wire, whereby the trim cover is tensioned and attached at the portion thereof to the cushioned pad by the clip.

8 Claims, 3 Drawing Sheets

CLIP FOR TENSIONING AND ATTACHING TRIM COVER, AND VEHICLE SEAT

BACKGROUND OF THE INVENTION

1. Field of the Invention

The present invention relates to a clip for tensioning a trim cover for covering a cushioned pad for a seat, and attaching a portion of the trim cover to the cushioned pad, by utilizing a tensioning cord attached to the portion of the trim cover. The present invention also relates to a vehicle seat in which a trim cover for the vehicle seat is tensioned and attached at a portion thereof to a cushioned pad for the vehicle seat by clips.

2. Description of the Related Art

As a clip for tensioning a trim cover for a vehicle seat and attaching a portion of the trim cover to a cushioned pad for the vehicle seat, there is proposed a clip that includes a frame body formed substantially into an upward facing U-shape in cross-section, a pair of spaced apart inverted-pawls provided at edges of both ends of the frame body so as to inwardly face each other, and a hook portion provided at the frame body so as to extend downward from a bottom surface of the frame body (Japanese Patent Application Laid-Open No. 2006-122594). The trim cover has a longitudinal tensioning cord previously attached to the portion of the trim cover and a longitudinal bulged member integrally provided along a longitudinal edge portion of the tensioning cord. A plurality of clips each constructed as discussed above are attached to the longitudinal bulged member of the tensioning cord of the trim cover so as to be disposed at predetermined intervals along the longitudinal bulged member, with substantially U-shaped frame bodies thereof receiving regions of the longitudinal bulged member therein and retainingly holding the regions of the longitudinal bulged member and with pawls thereof being stoppingly engaged with the regions of the longitudinal bulged member.

The trim cover having the clips attached to the longitudinal bulged member in the manner as discussed above is conveyed to a production line in which the trim cover is tensioned and attached at the portion thereof to the cushioned pad by the clips, and the cushioned pad is then covered by the trim cover. The cushioned pad has a recess portion in whose bottom an insert wire is embedded so as to be partially exposed at a plurality of axial portions thereof to the recess portion of the cushioned pad from the bottom of the recess portion of the cushioned pad. In the production line, the portion of the trim cover to which the clips are attached through the longitudinal bulged member as discussed above is received in the recess portion of the cushioned pad and the clips are then attached to the insert wire with hook portions thereof being hooked to exposed axial portions of the insert wire, whereby the trim cover is tensioned and attached at the portion thereof to the cushioned pad by the clips hooked between the longitudinal bulged member and the exposed axial portions of the insert wire. Then, the cushioned pad is covered by the trim cover.

In a condition where the clips are attached to the longitudinal bulged member of the trim cover, the U-shaped frame bodies of the clips receive the regions of the longitudinal bulged member and retainingly hold the regions of the longitudinal bulged member and the pawls are stoppingly engaged with the regions of the longitudinal bulged member, so that when the trim cover or the clips are subjected to vibration, shock, etc. which may occur during the conveying of the trim cover to the production line or during treating of the trim cover in the production line, the clips are easy to be considerably shifted relative to the longitudinal bulged member due to the vibration, shock, etc. Therefore, in the production line, prior to the hooking of the hook portions of the clips to the exposed axial portions of the insert wire, the positional deviation of the clips relative to the longitudinal bulged member must be corrected, thus causing drop of the production efficiency.

SUMMARY OF THE INVENTION

It is, therefore, desirable to provide a clip which is hard to be considerably shifted relative to a longitudinal bulged member of a tensioning cord attached to a portion of a trim cover for a seat and facilitates improving of the production efficiency. Moreover, there is a need for a clip which, in a condition where the clip is attached through a longitudinal bulged member to a portion of a trim cover for a seat, can be easily and precisely aligned with an exposed axial portion of an insert wire embedded in a cushioned pad for the seat, thus facilitating improving of the commodity value for the entire seat.

In accordance with one aspect of the present invention, there is provided a clip for use in a cushion for a seat, the cushion including a cushioned pad and a trim cover covering the cushioned pad, the cushioned pad having a recess portion and a wire embedded in the cushioned pad so as to be partially exposed to the recess portion from the cushioned pad, the trim cover having a portion, a longitudinal tensioning cord attached to the portion of the trim cover, a longitudinal bulged member provided along a longitudinal edge portion of the longitudinal tensioning cord, and a laterally elongated through-hole formed in the longitudinal tensioning cord, the laterally elongated through-hole being aligned with a partially exposed axial portion of the wire. The clip comprises a frame body having a substantially U-shape in cross-section, the frame body including first and second spaced apart side portions and an intermediate portion interconnecting the first and second spaced apart side portions, a pair of spaced apart inverted-pawls provided at edges of both ends of the substantially U-shaped frame body so as to be inwardly face each other, a hook portion provided on an outer surface of the intermediate portion so as to extend in such a direction as to be away from the intermediate portion, and a stopper piece provided on the first side portion of the frame body so as to stand up from the first side portion and extend beyond a space between the spaced apart inverted-pawls toward the second side portion of the frame body. The clip is adapted to be hooked between the longitudinal bulged member and the partially exposed axial portion of the wire, with the frame body receiving the longitudinal bulged member therein and retainingly holding the longitudinal bulged member, with the pawls being stoppingly engaged with the longitudinal bulged member, with the stopper piece being inserted through the laterally elongated through-hole, and with the hook portion being hooked to the exposed axial portion of the wire, whereby the trim cover is tensioned and attached at the portion thereof to the cushioned pad by the clip.

The clip constructed as discussed above includes the stopper piece which is adapted to be inserted through the through-hole of the tensioning cord, so that even if the trim cover having the clip attached to the longitudinal bulged member thereof, or the clip attached to the portion of the trim cover through the longitudinal bulged member is subjected to vibration, shock, etc. during conveying of the trim cover toward a production line in which the trim cover is tensioned and attached at the portion thereof to the cushioned pad by the clip and the cushioned pad is then covered by the trim cover, and/or during treating of the trim cover in the production line, the clip is prevented from being considerably shifted relative to the longitudinal bulged member. Therefore, frequencies of correcting a position of the clip with respect to the longitudinal bulged member and time taken in order to correct the position of the clip can be reduced. Thus, the clip according to the embodiment of the present invention contributes to decreasing of process tact. Moreover, the time taken in order to correct the position of the clip can be reduced, thus allowing a worker to be devoted to the assembling of the cushion, without being imposed with an additional burden, so that production efficiency can be improved. In addition, the clip is hard to be shifted with respect to the longitudinal bulged member, thus facilitating improving of the commodity value of the entire seat.

In a preferred embodiment of the present invention, the stopper piece has a width which is less than a width of the frame body which is measured in a longitudinal direction of the longitudinal bulged member, and which is also less than a length of the laterally elongated through-hole.

In the case where the stopper piece has the width which is less than the width of the frame body and less than length of the laterally elongated through-hole, even if the hook portion of the clip is positionally shifted with respect to the exposed axial portion of the wire, the positional deviation of the hook portion relative to the exposed axial portion of the wire can be adjusted in such a manner that the hook portion is aligned with the exposed axial portion of the wire, by causing the frame body to be shifted relative to the longitudinal bulged member in such a manner that the stopper piece is allowed to be shifted within the through-hole. Therefore, the clip can be appropriately hooked through the hook portion to the exposed axial portion of the wire and facilitates the tensioning of the trim cover and stable attaching of the portion of the trim cover to the cushioned pad, thus improving the commodity value for the entire seat.

In a preferred embodiment, the hook portion is formed substantially into a C-shape as viewed from a side and the clip further includes an elastic guide portion for guiding the partially exposed axial portion of the wire toward an innermost region of the substantially C-shaped hook portion. The elastic guide portion is provided on the outer surface of the intermediate portion so as to extend in such a direction as to be away from the intermediate portion. The elastic guide portion is spaced apart from the hook portion such that a space for receiving the partially exposed axial portion of the wire is provided between the elastic guide portion and the hook portion.

In the case where the clip includes the elastic guide portion for guiding the exposed axial portion of the wire toward the innermost region of the substantially C-shaped hook portion, the exposed axial portion of the wire can be easily guided into the innermost region of the substantially C-shaped hook portion.

According to a further aspect of the present invention, there is provided a vehicle seat. The vehicle seat comprises a cushion, the cushion including a cushioned pad and a trim cover covering the cushioned pad, the cushioned pad having a recess portion and a wire embedded in the cushioned pad so as to be exposed at a plurality of axial portions thereof to the recess portion from the cushioned pad, the trim cover having a portion, a longitudinal tensioning cord attached to the portion of the trim cover, a longitudinal bulged member provided along a longitudinal edge portion of the longitudinal tensioning cord, and a plurality of laterally elongated through-holes formed in the longitudinal tensioning cord so as to be disposed at predetermined intervals along the longitudinal bulged member, the laterally elongated through-holes being aligned with the exposed axial portions of the wire, and a plurality of clips. Each of the clips includes a frame body having a substantially U-shape in cross-section, the frame body including first and second spaced apart side portions and an intermediate portion interconnecting the first and second spaced apart side portions, a pair of spaced apart inverted-pawls provided at edges of both ends of the substantially U-shaped frame body so as to be inwardly face each other, a hook portion provided on an outer surface of the intermediate portion so as to extend in such a direction as to be away from the intermediate portion, and a stopper piece provided on the first side portion of the frame body so as to stand up from the first side portion and extend beyond a space between the spaced apart inverted-pawls toward the second side portion of the frame body. Each of the clips is hooked between a region of the longitudinal bulged member and corresponding one of the exposed axial portions of the wire, with the frame body receiving the region of the longitudinal bulged member therein and retainingly holding the region of the longitudinal bulged member, with the pawls being stoppingly engaged with the region of the longitudinal bulged member, with the stopper piece being inserted through corresponding one of the laterally elongated through-holes, and with the hook portion being hooked to the corresponding one of the exposed axial portion of the wire, whereby the trim cover is tensioned and attached at the portion thereof to the cushioned pad by each of the clips.

In the vehicle seat, even if dimple-shaped recess portions and a twisted tension line are produced on a surface of the trim cover by the tensioning of the trim cover, such dimple-shaped recess portions can be eliminated and the twisted tension line can be corrected, by causing the frame bodies to be shifted relative to the longitudinal bulged member in such a manner to allow the stopper pieces of the clip to be shifted within the through-holes or by causing the hook portions to be shifted relative to the exposed axial portions of the insert wire, prior to attaching of an outer peripheral portion of the trim cover to a frame for the cushion.

DETAILED DESCRIPTION OF THE PREFERRED EMBODIMENT

Figure 1:
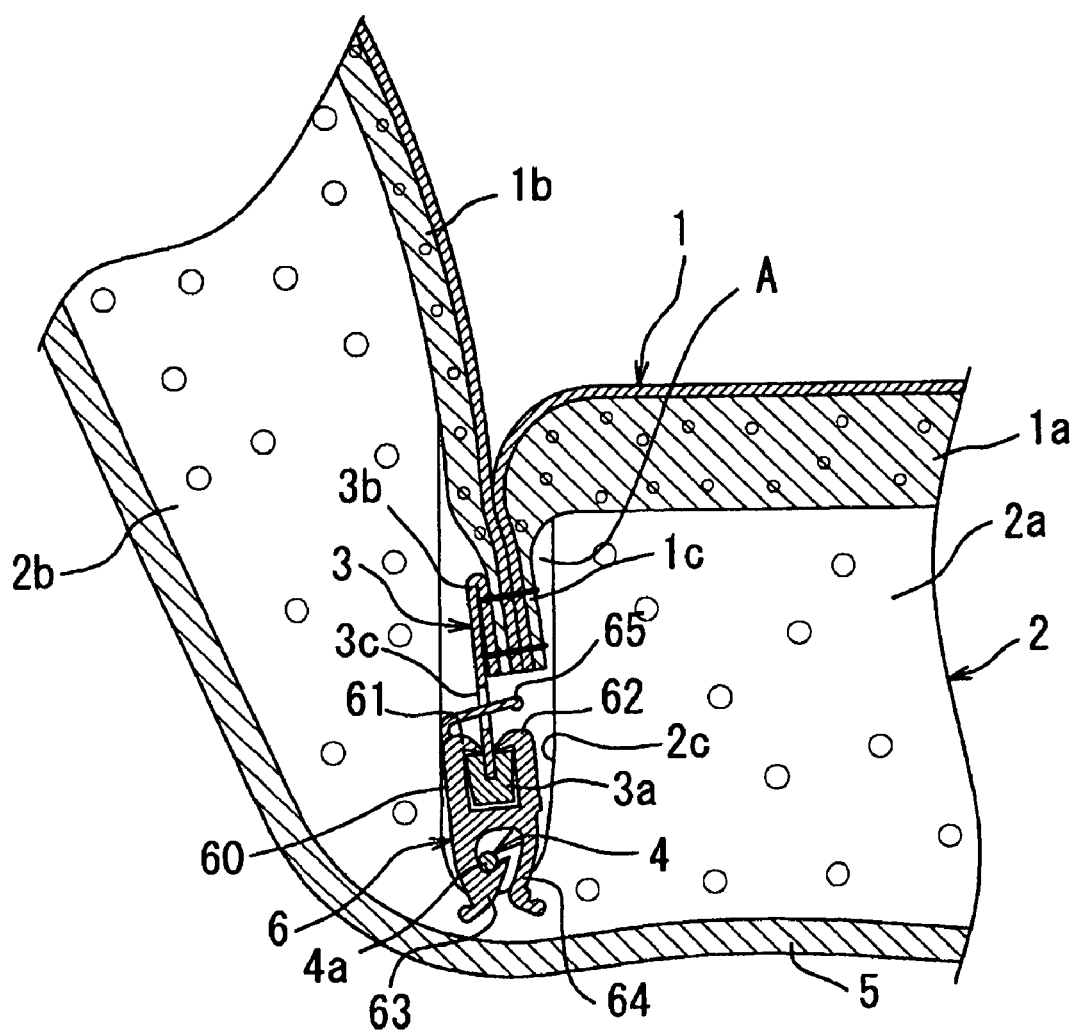
FIG. 1 is an explanatory view of a tensioning structure of a trim cover for a vehicle seat, in which the trim cover is tensioned and attached at a portion thereof to a cushioned pad for the vehicle seat by clips according to an embodiment of the present invention.

Referring to FIG. 1, there is illustrated a tensioning structure which allows a trim cover 1 for a seat cushion of a vehicle seat to be tensioned and attached at a portion 1c thereof to a cushioned pad 2 for the seat cushion by clips 6 according to an embodiment of the present invention in order to assemble the seat cushion of the vehicle seat (only one clip 6 is shown in FIG. 1). The trim cover 1 includes a first cover portion 1a covering a first portion 2a of the cushioned pad 2 which positionally corresponds to a section of the seat cushion on which a person is to sit, a second cover portion 1b covering a second bulged portion 2b of the cushioned pad 2 which positionally corresponds to a bank section of the seat cushion, and the third portion 1c formed by causing a terminal region of the first cover portion 1a and a terminal region of the second cover portion 1b to be sewed together. The third portion 1c of the trim cover 1 is received in a recess portion A of the cushioned pad 2 between the first portion 2a and the second bulged portion 2b, and tensioned and attached with respect to a bottom of the recess portion A of the cushioned pad 2 by the clips 6.

As shown in FIG. 1, a longitudinal tensioning cord 3 is previously sewed to the third portion 1c of the trim cover 1. The tensioning cord 3 includes a belt-shaped piece 3b of cloth and a longitudinal bulged member 3a like a welt. The longitudinal bulged member 3a is attached to a longitudinal lower edge portion of the belt-shaped cloth 3b so as to extend along the longitudinal lower edge portion. The tensioning cord 3 is sewed at an upper portion of the belt-shaped cloth 3b thereof to the third portion 1c of the trim cover 1. The longitudinal bulged member 3a of the tensioning cord 3 is resin-formed integrally with the longitudinal lower edge portion of the belt-shaped cloth 3b. The longitudinal bulged member 3a is formed of synthetic resin, for example, polypropylene resin. The longitudinal bulged member 3a is configured to have a square-shape, an inverted triangular-shape, or a round-shape in cross-section. However, the cross-sectional shape of the longitudinal bulged member 3a is not limited to the shape discussed above. The belt-shaped cloth 3b may comprise a piece of cloth such as non-woven. fabric.

In the illustrated example, the cushioned pad 2 has a metal-made insert wire 4 which is embedded in the bottom of the recess portion A so as to be partially exposed at a plurality of axial portions 4a thereof to the recess portion A from the bottom of the recess portion A (only one axial portion 4a of the insert wire 4 is shown in FIG. 1). In FIG. 1, a reference numeral 5 denotes a backing member attached onto a bottom surface of the cushioned pad 2.

The third portion 1c of the trim cover 1 which is received in the recess portion A of the cushioned pad 2 is tensioned and attached with respect to the bottom of the recess portion A of the cushioned pad 2 by the clips 6 which are hooked between the longitudinal bulged member 3a of the tensioning cord 3 and the exposed axial portions 4a of the insert wire 4 as will be discussed hereinafter. The tensioning cord 3 has a plurality of laterally elongated through-holes 3c formed in the belt-shaped cloth 3b so as to be disposed at predetermined intervals along the longitudinal direction of the belt-shaped cloth 3b (only one through-hole 3c is shown in FIG. 1). Portions of the belt-shaped cloth 3b in which the through-holes 3c are formed are substantially aligned with the exposed axial portions 4a of the insert wire 4.

Figure 2:
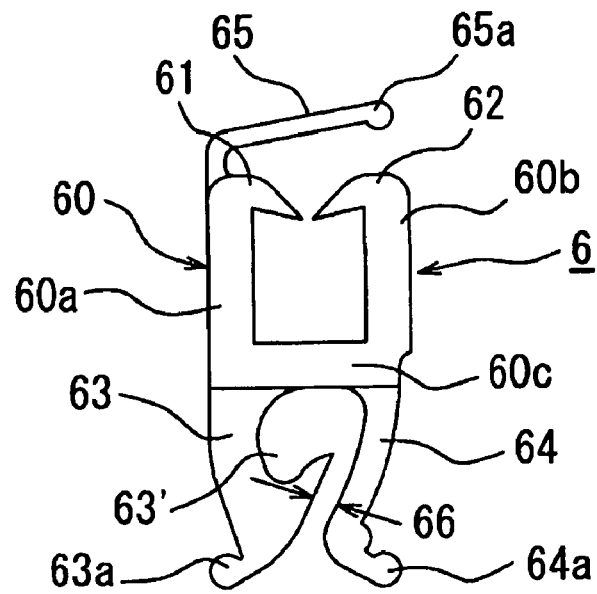
FIG. 2 is a schematic side view of a clip shown in FIG. 1.

Referring to FIG. 2, each of the clips 6 includes a frame body 60, a pair of spaced apart inverted-pawls 61, 62, a hook portion 63, an elastic guide portion 64, and a stopper piece 65. The clip 6 is formed of synthetic resin, such as polypropylene resin or polyethylene resin, and is in one-piece form.

The frame body 60 of the clip 6 is formed substantially into an upward facing U-shape in cross-section which allows a region of the longitudinal bulged member 3a of the tensioning cord 3 to be received within the frame body 60 and retainedly held by the frame body 60. More particularly, the frame body 60 includes a pair of first and second spaced apart side portions 60a, 60b and an intermediate portion 60c interconnecting the spaced apart side portions 60a, 60b. As long as the frame body 60 of the clip has a depth which allows the region of the longitudinal bulged member 3a of the tensioning cord 3 to be received within the frame body 60 and retainedly held by the frame body 60, the cross-sectional shape of the frame body 60 is not limited to the upward facing U-shape. The pawls 61, 62 are provided at edges of both ends of the frame body 60 so as to inwardly face each other. Attaching of the frame body 60 to the region of the longitudinal bulged member 3a is performed by causing the region of the longitudinal bulged member 3a to be received into the frame body 60 via a space between the pawls 61, 62, while causing the region of the longitudinal bulged member 3a to be pushed against the pawls 61, 62 to thereby cause the pawls 61, 62 to be elastically deformed downward. When the frame body 60 of the clip 6 is attached to the region of the longitudinal bulged member 3a in the manner discussed above, the pawls 61, 62 are elastically restored, whereby a portion of the belt-shaped cloth 3b which is adjacent the longitudinal lower edge portion of the belt-shaped cloth 3b to which the longitudinal bulged member 3a is attached is pinched by the pawls 61, 62 as shown in FIG. 1. In order that the region of the longitudinal bulged member 3a can cause the pawls to be elastically deformed and easily slip into the frame body 60 via the space between the pawls 60, 61, an upper surface of each of the pawls 61, 62 is tapered so as to descend inwardly as shown in FIG. 2.

The hook portion 63 of the clip 6 is provided at the frame body 60 so as to extend downward from an outer bottom surface of the intermediate portion 60c of the frame body 60. The hook portion 63 is formed substantially into a C-shape as viewed from a side, which allows corresponding one of the exposed axial portions 4a of the insert wire 4 to be hooked to the hook portion 63. The guide portion 64 of the clip 6 is also provided at the frame body 60 so as to extend downward from the outer bottom surface of the intermediate portion 60c of the frame body 60. The hook portion 63 and the guide portion 64 are spaced apart from each other such that a space 66 which receives the exposed axial portion 4a of the insert wire 4 and allows the exposed axial portion 4a of the insert wire 4 to be guided toward an innermost region 63' of the substantially C-shaped hook portion 63 along the guide portion 64 is provided between the hook portion 63 and the guide portion 64.

Figure 3:
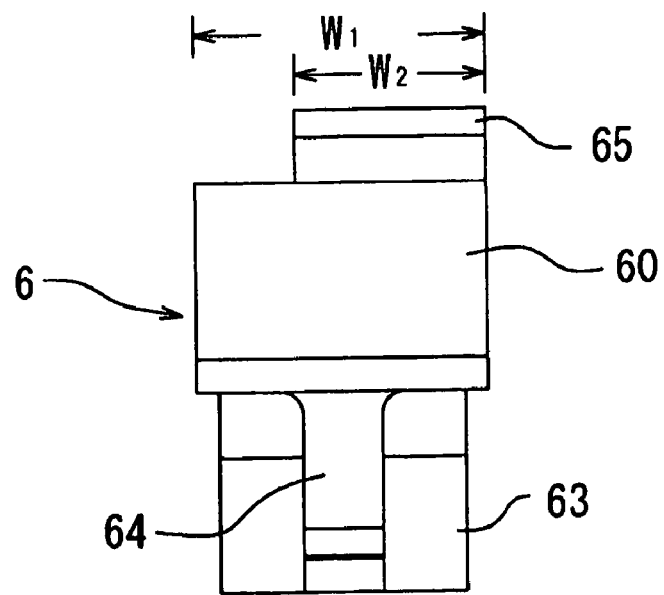
FIG. 3 is a schematic front view of the clip shown in FIG. 1.
Figure 4:
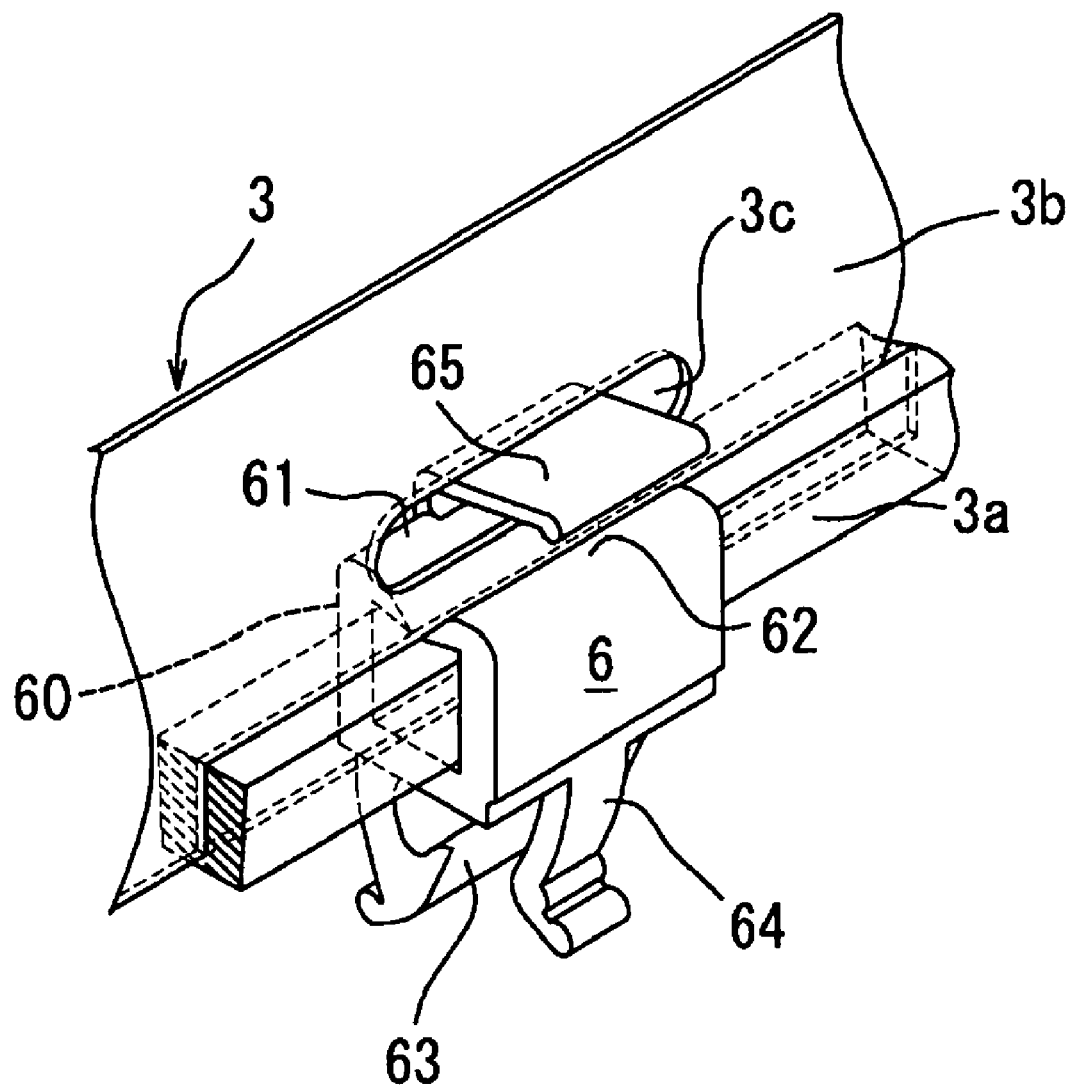
FIG. 4 is a schematic perspective view of the clip of FIG. 1 attached to a tensioning cord.

The hook portion 63 is configured to have a thickness which allows the hook portion 63 to retain the shape of the hook portion 63. Referring to FIGS. 3 and 4, the guide portion 64 is configured to have a width less than that of the hook portion 63 and is elastically deformable while exhibiting rigidity. More particularly, the guide portion 64 is opposed to the hook portion 63 at a substantially middle position of a width direction of the hook portion 63. The space 66 between the hook portion 63 and the guide portion 64 is set so as to be slightly smaller than a diameter of the insert wire 4. An inner surface of a free end region of the hook portion 63 and an inner surface of a free end region of the guide portion 64 are curved such that the exposed axial portion 4a of the insert wire 4 is allowed to be positively and easily received in the space 66 between the hook portion 63 and the guide portion 64.

The stopper piece 65 of the clip 6 is provided on the first side portion 60a of the frame body 60. More particularly, the stopper piece 65 is formed substantially into an L-shape as viewed from a side, stands up from the first side portion 60a of the frame body 60, and extends beyond the space between the pawls 61, 62 toward the second side portion 60b of the frame body 60. The stopper piece 65 is configured to have a width $W_2$ which is less than a width $W_1$ of the frame body 60 which is measured in the longitudinal direction of the longitudinal bulged member ($W_1 > W_2$) as shown in FIG. 3, and which is also less than a length of each of the through-holes 3c formed in the belt-shaped cloth 3b of the tensioning cord 3 as shown in FIG. 4 (only one through-hole 3c is shown in FIG. 4).

As shown in FIG. 2, a free end region of the stopper piece 65, the free end region of the hook portion 63, and the free end region of the guide portion 64 are provided with a round part 65a, a round part 63a, and a round part 64a, respectively. The length of each of the through-holes 3c formed in the belt-shaped cloth 3b may be substantially equal to the width $W_1$ of the frame body 60 or be slightly longer than the width $W_1$ of the frame body 60.

After the clips 6 which are each constructed as discussed above are attached to the longitudinal bulged member 3a of the tensioning cord 3 so as to be disposed at predetermined intervals along the longitudinal bulged member 3a as will be discussed in detail hereinafter, the trim cover 1 is conveyed to a production line in which the trim cover 1 is tensioned and attached at the third portion 1c thereof to the cushioned pad 2 by the clips 6. More particularly, as shown in FIG. 4, each of the clips 6 (only one clip 6 is shown in FIG. 4) is attached to the longitudinal bulged member 3a with the frame body 60 receiving the region of the longitudinal bulged member 3a therein and retainingly holding the region of the longitudinal bulged member 3a, with the pawls 61, 62 being stoppingly engaged with the region of the longitudinal bulged member 3a, and with the stopper piece 65 being inserted through corresponding one of the through-holes 3c formed in the belt-shaped cloth 3b of the tensioning cord 3.

The stopper pieces 65 of the clips 6 are inserted through the through-holes 3c of the tensioning cord 3 as discussed above, so that even if the trim cover 1 or the clips 6 are subjected to vibration, shock, etc. which may occur during the conveying of the trim cover 1 to the production line and/or during treating of the trim cover 1 in the production line, and the clips 6 are shifted relative to the longitudinal bulged member 3a in the longitudinal direction of the longitudinal bulged member 3a due to the vibration, shock, etc., the stopper pieces 65 of the clips 6 are engagingly abutted against edges of the through-holes 3c of the belt-shaped cloth 3b of the tensioning cord 3, so that the clips 6 are prevented from being considerably moved in such a manner to cause the stopper pieces 65 to be shifted beyond the edges of the through-holes 3c.

Therefore, frequencies of correcting positions of the clips 6 with respect to the longitudinal bulged member 3a and time taken in order to correct the positions of the clips 6 can be reduced. Moreover, the time taken in order to correct the positions of the clips 6 can be reduced, thus allowing a worker to be devoted to the assembling of the seat cushion without being imposed with an additional burden in the production line, so that production efficiency can be improved. In addition, the clips 6 are hard to be considerably shifted with respect to the longitudinal bulged member 3a and the trim cover 1 is stably attached at the third portion 1c thereof to the cushioned pad 2 as will be discussed hereinafter, thus improving the commodity value for the entire vehicle seat.

Moreover, the width $W_2$ of the stopper piece 65 of each of the clips 6 is less than the width $W_1$ of the frame body 60 of the clip 6 ($W_1 > W_2$) and is also less than the length of each of the through-holes 3c of the belt-shaped cloth 3b as discussed above, so that the position of the clip 6 relative to the longitudinal bulged member 3a can be adjusted in such a manner to cause the hook portion 63 to be aligned with a position of the corresponding exposed axial portion 4a of the insert wire 4, by causing the frame body 60 to be shifted relative to the longitudinal bulged member 3a to the extent that the stopper piece 65 is shifted within the through-hole 3c. Therefore, the clips 6 can be appropriately attached to the longitudinal bulged member 3a in such a manner that the hook portions 63 are aligned with the exposed axial portions 4a of the insert wire 4, and facilitate precise and stable attaching of the third portion 1c of the trim cover 1 to the cushioned pad 2, thus improving the commodity value for the entire vehicle seat.

The attaching of the third portion 1c of the trim cover 1 to the cushioned pad 2 by the clips 6 is performed as follows. First of all, each of clips 6 attached to the longitudinal bulged member 3a as discussed above is pushed at its hook portion 63 and its guide portion 64 against the bottom of the recess portion A of the cushioned pad 2 in such a manner that the space 66 between the hook portion 63 and the guide portion 64 is directed to the corresponding one of the exposed axial portions 4a of the insert wire 4. At this time, the hook portion 63 and the guide portion 64 are contacted with the bottom of the recess portion A of the cushioned pad 2 and the guide portion 64 of the clip 6 is elastically deformed outwardly while depressing a region of the bottom of the cushion pad 2, to thereby cause the space 66 between the guide portion 64 and the hook portion 63 to be widened, so that the exposed axial portion 4a of the insert wire 4 is received into the widened space 66 between the hook portion 63 and the guide portion 64. When the clip 6 is further pushed down against the cushioned pad 2, the guide portion 64 is further elastically deformed outwardly while further depressing the region of the cushioned pad 2, and the exposed axial portion 4a of the insert wire 4 is guided toward the innermost region 63' of the hook portion 63 along the inner curved surface of the guide portion 64.

In this condition, when the clip 6 is released from the pushed-state, the guide portion 64 is elastically restored while allowing the space 66 between the hook portion 63 and the guide portion 64 to be narrowed. By the elastic movement of the guide portion 64, the exposed axial portion 4a of the insert wire 4 is guided into the innermost region 63' of the hook portion 63, so that the hook portion 63 is positively hooked to the exposed axial portion 4a of the insert wire 4 so as not to be detached from the exposed axial portion 4a of the insert wire 4. Thus, the trim cover 1 is tensioned and attached at the third portion 1c thereof to the cushioned pad 2 through the clips 6 which are hooked between the longitudinal bulged member 3a of the tensioning cord 3 and the exposed axial portions 4a of the insert wire 4. Then, the entire cushioned pad 2 is covered with the trim cover 1.

The clips 6 have the same fixed structure, so that the tensioning forces exerted on the trim cover 1 by the clips 6 are maintained constant and the third portion 1c of the trim cover 1 is tensioned with a constant depth. Moreover, in the seat cushion which is assembled by causing the third portion 1c of the trim cover 1 to be attached to the entire cushioned pad 2 by the clips 6 in the manner as discussed above, and causing the cushioned pad 2 to be covered by the trim cover 1, the pawls 61, 62 stoppingly engaged with the regions of the longitudinal bulged member 3a, and the hook portions 63 hooked to the exposed axial portions of the insert wire 4 are pulled toward each other, so that even if a weight load of an occupant sitting on the vehicle seat is applied to the seat cushion, the third portion 1c of the trim cover 1 is not detached from the cushioned pad 2.

After the third portion 1c of the trim cover 1 is attached to the cushioned pad 2 through the clips 6 and the exposed axial portions of the insert wire 4, an outer peripheral portion of the trim cover 1 is attached to a frame (not shown) for the seat cushion, whereby the entire cushioned pad 2 is covered with the trim cover 1. Even if dimple-shaped recess portions and a twisted tension line are produced on a surface of the trim cover 1 by the tensioning of the trim cover 1, such dimple-shaped recess portions can be eliminated and such a twisted tension line can be corrected, by causing the frame bodies 60 to be shifted relative to the longitudinal bulged member 3a in such a manner to allow the stopper pieces 65 of the clips 6 to be shifted within the through-holes 3c or by causing the hook portions 63 to be shifted relative to the exposed axial portions of the insert wire 4, prior to the attaching of the outer peripheral portion of the trim cover 1 to the seat cushion frame.

In the condition where the third portion 1c of the trim cover 1 is attached to the cushioned pad 2 in the manner as discussed above, the free end regions of the hook portions 63 of the clips 6 and the free end regions of the guide portions 64 of the clips 6 are contacted with the cushioned pad 2, so that the clips 6 are positioned by the hook portions 63 and the guide portions 64 so as not to be shifted from the predetermined attaching positions of the clips 6.

While the case where the present invention is applied to the seat cushion of the vehicle seat has been discussed above with reference to the embodiment of the present invention, the present invention may be applied to a seat back of the vehicle seat. Moreover, in lieu of the insert wire, any suitable tension wire may be employed. In this case, the tension wire is also embedded in the bottom of the recess portion of the cushioned pad so as to be partially exposed at a plurality of axial portions thereof to the recess portion A of the cushioned pad 2 from the bottom of the recess portion of the cushioned pad 2. In addition, each of the clips 6 is not always provided with the guide portion 64. In a case where each of the clips 6 is not provided with the guide portion, each of the exposed axial portions of the insert wire or tension wire has a length slightly longer than the width of the hook portion 63 of the clip 6 and the clip 6 is easily hooked to the exposed axial portion of the insert wire or tension wire by causing the free end region of the hook portion 63 to be located under the exposed axial portion of the wire while pushing the hook portion 63 against the bottom of the recess portion A of the cushioned pad 2, and then pulling the hook portion 63 upward. Incidentally, the region of the recess portion of the cushioned pad 2 in which the wire 4 is embedded is not limited to the bottom of the recess portion of the cushioned pad 2. The wire may be embedded in any region of the recess portion of the cushioned pad except the bottom of the recess portion of the cushioned pad, so as to be partially exposed at a plurality of axial portions thereof to the recess portion of the cushioned pad from the region of the recess portion.

The terms and expressions which have been employed herein are used as terms of description and not of limitation. There is no intention in the use of such terms and expressions to exclude any equivalents of the features shown and described, or any portion thereof. It is recognized, however, that various modifications are possible within the scope of the invention claimed.

What is claimed is:

1. A clip for use in a cushion for a seat, said cushion including a cushioned pad and a trim cover covering said cushioned pad, said cushioned pad having a recess portion and a wire embedded in said cushioned pad so as to be partially exposed to said recess portion from said cushioned pad, said trim cover having a portion, a longitudinal tensioning cord attached to said portion of said trim cover, a longitudinal bulged member provided along a longitudinal edge portion of said longitudinal tensioning cord, and a laterally elongated through-hole formed in said longitudinal tensioning cord, said laterally elongated through-hole being aligned with a partially exposed axial portion of said wire;

said clip comprising:
a frame body having a substantially U-shape in cross-section;
said frame body including first and second spaced apart side portions and an intermediate portion interconnecting said first and second spaced apart side portions;
a pair of spaced apart inverted-pawls provided at edges of both ends of said substantially U-shaped frame body so as to inwardly face each other;
a hook portion provided on an outer surface of said intermediate portion so as to extend in such a direction as to be away from said intermediate portion; and
a stopper piece provided on said first side portion of said frame body so as to stand up from said first side portion and extend beyond a space between said spaced apart inverted-pawls toward said second side portion of said frame body;
said clip being adapted to be hooked between said longitudinal bulged member and said exposed axial portion of said wire, with said frame body receiving said longitudinal bulged member therein and retainingly holding said longitudinal bulged member, with said pawls being stoppingly engaged with said longitudinal bulged member, with said stopper piece being inserted through said laterally elongated through-hole, and with said hook portion being hooked to said exposed axial portion of said wire, whereby said trim cover is tensioned and attached at said portion thereof to said cushioned pad by said clip.

2. A clip according to claim 1, wherein said stopper piece has a width which is less than a width of said frame body which is measured in a longitudinal direction of said bulged member, and which is also less than a length of said laterally elongated through-hole.

3. A clip according to claim 2, wherein said hook portion is formed substantially into a C-shape as viewed from a side, and wherein said clip further includes an elastic guide portion for guiding said partially exposed axial portion of said wire toward an innermost region of said substantially C-shaped hook portion, said elastic guide portion being provided on said outer surface of said intermediate portion so as to extend in such a direction as to be away from said intermediate portion, said elastic guide portion being spaced apart from said hook portion such that a space for receiving said partially exposed axial portion of said wire is provided between said elastic guide portion and said hook portion.

4. A clip according to claim 1, wherein said hook portion is formed substantially into a C-shape as viewed from a side, and wherein said clip further includes an elastic guide portion for guiding said partially exposed axial portion of said wire toward an innermost region of said substantially C-shaped hook portion, said elastic guide portion being provided on said outer surface of said intermediate portion so as to extend in such a direction as to be away from said intermediate portion, said elastic guide portion being spaced apart from said hook portion such that a space for receiving said partially exposed axial portion of said wire is provided between said elastic guide portion and said hook portion.

5. A vehicle seat comprising:
a cushion;
said cushion including a cushioned pad and a trim cover covering said cushioned pad;
said cushioned pad having a recess portion and a wire embedded in said cushioned pad so as to be exposed at a plurality of axial portions thereof to said recess portion from said cushioned pad;
said trim cover having a portion, a longitudinal tensioning cord attached to said portion of said trim cover, a longitudinal bulged member provided along a longitudinal edge portion of said longitudinal tensioning cord, and a plurality of laterally elongated through-holes formed in said longitudinal tensioning cord so as be disposed at predetermined intervals along the longitudinal bulged member, said laterally elongated through-holes being aligned with said exposed axial portions of said wire; and a plurality of clips;

each of said clips including:

a frame body having a substantially U-shape in cross-section;

said frame body including first and second spaced apart side portions and an intermediate portion interconnecting said first and second spaced apart side portions;

a pair of spaced apart inverted-pawls provided at edges of both ends of said substantially U-shaped frame body so as to be inwardly face each other;

a hook portion provided on an outer surface of said intermediate portion so as to extend in such a direction as to be away from said intermediate portion; and a stopper piece provided on said first side portion of said frame body so as to stand up from said first side portion and extend beyond a space between said spaced apart inverted-pawls toward said second side portion of said frame body;

said each of said clips being hooked between a region of said longitudinal bulged member and corresponding one of said exposed axial portions of said wire, with said frame body receiving said region of said longitudinal bulged member therein and retainingly holding said region of said longitudinal bulged member, with said pawls being stoppingly engaged with said region of said longitudinal bulged member, with said stopper piece being inserted through corresponding one of said laterally elongated through-holes, and with said hook portion being hooked to said corresponding one of said exposed axial portions of said wire, whereby said trim cover is tensioned and attached at said portion thereof to said cushioned pad by said each of said clips.

6. A vehicle seat according to claim 5, wherein said stopper piece has a width which is less than a width of said frame body which is measured in a longitudinal direction of said longitudinal bulged member, and which is also less than a length of each of said laterally elongated through-holes.

7. A vehicle seat according to claim 6, wherein said hook portion is formed substantially into a C-shape as viewed from a side, and wherein said each of said clips further includes an elastic guide portion for guiding said corresponding one of said exposed axial portions of said wire toward an innermost region of said substantially C-shaped hook portion, said elastic guide portion being provided on said outer surface of said intermediate portion so as to extend in such a direction as to be away from said intermediate portion, said elastic guide portion being spaced apart from said hook portion such that a space for receiving said corresponding one of said exposed axial portions of said wire is provided between said elastic guide portion and said hook portion.

8. A vehicle seat according to claim 5, wherein said hook portion is formed substantially into a C-shape as viewed from a side, and wherein said each of said clips further includes an elastic guide portion for guiding said corresponding one of said exposed axial portions of said wire toward an innermost region of said substantially C-shaped hook portion, said elastic guide portion being provided on said outer surface of said intermediate portion so as to extend in such a direction as to be away from said intermediate portion, said elastic guide portion being spaced apart from said hook portion such that a space for receiving said corresponding one of said exposed axial portions of said wire is provided between said elastic guide portion and said hook portion.

* * * * *